United States Patent
Koike et al.

(10) Patent No.: US 9,534,129 B2
(45) Date of Patent: Jan. 3, 2017

(54) NON-AQUEOUS INK JET INK COMPOSITION AND INK JET RECORDING METHOD

(71) Applicant: Seiko Epson Corporation, Tokyo (JP)

(72) Inventors: Naoki Koike, Matsumoto (JP); Jun Ito, Shimosuwa (JP); Kenichiro Kubota, Matsumoto (JP); Makoto Nagase, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/045,722

(22) Filed: Feb. 17, 2016

(65) Prior Publication Data

US 2016/0237293 A1 Aug. 18, 2016

(30) Foreign Application Priority Data

Feb. 18, 2015 (JP) ................. 2015-029270

(51) Int. Cl.
*B41J 11/00* (2006.01)
*B41J 2/17* (2006.01)
*C09D 11/36* (2014.01)
*C09D 11/14* (2006.01)
*C09D 11/322* (2014.01)

(52) U.S. Cl.
CPC ............. *C09D 11/36* (2013.01); *C09D 11/14* (2013.01); *C09D 11/322* (2013.01)

(58) Field of Classification Search
CPC ....... C09D 11/322; C09D 11/36; C09D 11/30; B41J 2/2107; B41J 2/01

USPC ........................ 347/95, 100; 106/31.65, 31.6
See application file for complete search history.

(56) References Cited

U.S. PATENT DOCUMENTS

| 8,894,197 B2 * | 11/2014 | Oyanagi | B41J 2/21 347/100 |
| 2007/0044684 A1 * | 3/2007 | Nakano | C09D 11/36 106/31.86 |
| 2008/0250970 A1 * | 10/2008 | Oyanagi | C09D 11/36 106/31.65 |

FOREIGN PATENT DOCUMENTS

JP    2012-219202 A    11/2012

* cited by examiner

*Primary Examiner* — Jannelle M Lebron
(74) *Attorney, Agent, or Firm* — Harness, Dickey & Pierce, P.L.C.

(57) ABSTRACT

A non-aqueous ink jet ink composition contains a glitter pigment, glycol diether represented by the following formula 1 and having a flash point of 70° C. or less, and glycol monoether represented by the following formula 2:

$$R^1O-(R^2O)_m-R^3 \quad \text{Formula 1:}$$

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.); and $$HO-(R^4O)_n-R^5 \quad \text{Formula 2:}$$

(In Formula 2, $R^4$ each independently represents alkylene groups having 2 to 3 carbon atoms, $R^5$ is an alkyl group having 1 to 4 carbon atoms, and n is an integer of 1 to 4.).

16 Claims, No Drawings

NON-AQUEOUS INK JET INK COMPOSITION AND INK JET RECORDING METHOD

BACKGROUND

1. Technical Field

The present invention relates to a non-aqueous ink jet ink composition and an ink jet recording method.

2. Related Art

An ink jet recording method allows recording of high definition images with a relatively simple apparatus, and thus the ink jet recording method has been rapidly developed in various fields. In the development, various researches have been conducted for obtaining various images. For example, for the purpose of providing a non-aqueous ink composition for ink jet printing capable of recording images excellent in glossiness while the non-aqueous ink composition having good viscosity, JP-A-2012-219202 describes a non-aqueous ink composition for ink jet printing, which contains a glitter pigment, a compound represented by the following general formula (1), and an organic solvent.

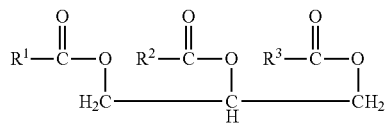

(In Formula (1), $R^1$, $R^2$, and $R^3$ each independently represent alkyl groups having carbon atoms of 1 or more and 3 or less.)

However, the ink composition described in JP-A-2012-219202 has a problem that the glitter of the recorded matter to be obtained has not yet been sufficient.

SUMMARY

An advantage of some aspects of the invention is to provide a non-aqueous ink jet ink composition capable of obtaining recorded matter excellent in glitter and an ink jet recording method using the non-aqueous ink jet ink composition.

The present inventors have conducted an intensive research in order to achieve improvements. As a result, the present inventors have found that the advantage can be achieved by the use of an ink composition having a predetermined composition, and thus have accomplished the invention.

More specifically, the invention is as follows.

[1] A non-aqueous ink jet ink composition containing a glitter pigment, glycol diether represented by the following formula 1 and having a flash point of 70° C. or less, and glycol monoether represented by the following formula 2:

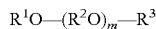  Formula 1:

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.); and

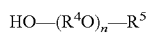  Formula 2:

(In Formula 2, $R^4$ each independently represents alkylene groups having 2 to 3 carbon atoms, $R^5$ is an alkyl group having 1 to 4 carbon atoms, and n is an integer of 1 to 4.).

[2] The non-aqueous ink jet ink composition according to [1] above, in which the content of the glycol diether is 40 to 90 wt %.

[3] The non-aqueous ink jet ink composition according to [1] or [2] above, in which the content of the glycol monoether is 20 wt % or less.

[4] The non-aqueous ink jet ink composition according to any one of [1] to [3] above, in which the content of the glitter pigment is 0.50 to 5.0 wt %.

[5] The non-aqueous ink jet ink composition according to any one of [1] to [4] above, in which the ratio of the content of the glycol diether to the content of the glycol monoether (Content of the glycol diether/Content of the glycol monoether) is 2.0 or more and less than 20.

[6] The non-aqueous ink jet ink composition according to any one of [1] to [5] above further containing cyclic lactone.

[7] The non-aqueous ink jet ink composition according to any one of [1] to [6] above further containing cellulose acetate butyrate.

[8] The non-aqueous ink jet ink composition according to any one of [1] to [7] above, in which the glitter pigment has a plate-like particle and the 50% average particle diameter R50 of the equivalent circle diameter determined from the area of the X-Y plane of the plate-like particles is 0.20 to 3.0 μm.

[9] An ink jet recording method including causing the non-aqueous ink jet ink composition according to any one of [1] to [8] above to adhere to a target recording medium.

DESCRIPTION OF EXEMPLARY EMBODIMENTS

Hereinafter, an embodiment of the invention (hereinafter referred to as "this embodiment") is described in detail but the invention is not limited to this embodiment and can be variously modified without deviating from the scope of the invention.

Non-Aqueous Ink Jet Ink Composition

A non-aqueous ink jet ink composition of this embodiment (hereinafter also referred to as "ink composition") contains a glitter pigment, glycol diether represented by the following formula 1 and having a flash point of 70° C. or less, and glycol monoether represented by the following formula 2:

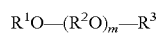  Formula 1:

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.); and

  Formula 2:

(In Formula 2, $R^4$ each independently represents alkylene groups having 2 to 3 carbon atoms, $R^5$ is an alkyl group having 1 to 4 carbon atoms, and n is an integer of 1 to 4.).

As ink for use in an ink jet recording system, an aqueous ink containing water as the main solvent and a solvent ink (non-aqueous ink) containing an organic solvent as the main solvent are generally used. In the non-aqueous ink, the content of water in the ink is preferably 5 mass % or less, more preferably 3 mass % or less, and still more preferably 1 mass % or less. The solvent ink is roughly classified into two kinds of ink of a real solvent (high solvent) ink and an eco solvent (low solvent) ink. The eco solvent ink is a solvent ink in which a coloring material is dispersed into an organic solvent having low odor and being environmentally and bodily friendly. The organic solvent for use in the eco solvent ink does not fall under the organic solvents designated by the Industrial Safety and Health Act, does not fall under Type 1 organic solvents and Type 2 organic solvents designated by the Prevention of Organic Solvent Poisoning, or is not obligated to use a local exhaust ventilation at indoor workplaces in the installation environment prescribed by the Fire Service Act.

When the solvent ink containing a glitter pigment is caused to adhere to a target recording medium, recorded matter having glitter can be obtained. The glitter of the recorded matter originates from the glitter pigment, and the glitter degree depends on the quality of materials of the pigment and also depends on the adhesion aspect of the pigment on the recorded matter. Specifically, when the pigment adheres to a target recording medium in an aspect in which the pigment is likely to reflect light (for example, an aspect in which the light reflecting surface on the pigment is approximately parallel to the plane direction of the target recording medium), the glitter of the recorded matter, which is observed by persons, improves or when the pigment adheres to a target recording medium in an aspect in which the pigment does not sufficiently reflect light (for example, an aspect in which the light reflecting surface of the pigment does not face in a direction that is relatively different from the plane direction of the target recording medium), the glitter decreases.

Ideally, when the pigment is more uniformly spread on a target recording medium in such a manner that the light reflecting surface is approximately parallel to the plane direction of the target recording medium, the glitter further improves. However, such control of the adhesion aspect of the glitter pigment is not easy. For example, when the drying property of the ink composition is low, the period of time while the pigment can flow in ink droplets adhering to the target recording medium is prolonged until the ink droplets dry, which accelerates the aggregation of the pigments and disorder of alignment. Moreover, since the ink droplets contain a plurality of kinds of solvents different in volatility, a solvent having low volatility becomes rich in the drying process. It is considered that this state impairs the pigment dispersion stability and also further accelerates the aggregation of the pigments. Furthermore, when the drying property of the ink composition is excessively high, the solvent dries before the glitter pigments are arranged on the target recording medium, so that the glitter decreases.

Such control of the adhesion aspect of the glitter pigment relating to the drying property of the ink composition tends to be more difficult in the solvent ink in which various kinds of solvents may be used than in the aqueous ink which can be expected to approximately uniformly dry.

On the other hand, the ink composition of this embodiment can obtain recorded matter excellent in glitter due to the fact that both a predetermined glycol diether and a predetermined glycol monoether are contained in combination. Hereinafter, each component of the ink composition of this embodiment is specifically described.

Glitter Pigment

The glitter pigment has a function of giving glitter to a pattern formed by the adhesion thereof to a target recording medium. The glitter pigment is not particularly limited and pearl pigments and metallic pigments are mentioned, for example. The glitter pigments may be used alone or in combination of two or more kinds thereof.

The pearl pigments are not particularly limited and pigments having pearly glossiness and coherent glossiness, such as titanium dioxide coated mica, argentine, and bismuth acid chloride, are mentioned, for example.

The metallic pigments are not particularly limited and, particles of aluminum, silver, gold, platinum, nickel, chromium, tin, zinc, indium, titanium, copper, and the like, simple substances thereof or alloys thereof, and mixtures thereof are mentioned, for example.

As the glitter pigment, any substance can be used insofar as ink liquid droplets can be discharged by an ink jet recording method and it is preferable that a particle contained therein have a shape having a certain reflection surface. From such a viewpoint, the glitter pigment preferably has a plate-like particle and preferably has a 50% average particle diameter R50 of the equivalent circle diameter determined from the area of the X-Y plane of the plate-like particles of 0.20 to 3.0 µm. By the use of such plate-like particles, the discharge stability and the glitter of the recorded matter to be obtained tends to further improve. Herein the "plate-like particles" refer to particles having an approximately flat surface (X-Y plane) and having an approximately uniform thickness (Z). By producing the plate-like particles by crushing a metal-deposited film, metal particles having an approximately flat surface and having an approximately uniform thickness can be obtained. Therefore, the major axis on the plane of the plate-like particles can be defined as X, the minor axis can be defined as Y, and the thickness can be defined as Z. The "equivalent circle diameter" refers to a diameter of a circle when the approximately flat surface (X-Y plane) of the plate-like particles of the pigment is assumed to be a circle having the same projected area as the projected area of the particles of the pigment. For example, when the approximately flat surface (X-Y plane) of the plate-like particles of the pigment has a polygonal shape, the diameter of a circle obtained by converting the projected surface of the polygon to a circle is referred to as an equivalent circle diameter of the plate-like particles of the pigment.

The average particle diameter R50 of the glitter pigment is preferably 0.20 to 3.0 µm, more preferably 0.50 to 3.0 µm, and still more preferably 0.75 to 3.0 µm. Due to the fact that the average particle diameter R50 of the glitter pigment is within the ranges mentioned above, the discharge stability and the glitter of the recorded matter to be obtained tend to further improve.

The thickness Z of the glitter pigment preferably satisfies Average particle diameter R50/Z>5. Due to the fact that the thickness of the glitter pigment is within the ranges mentioned above, the discharge stability and the glitter of the recorded matter to be obtained tend to further improve.

The content of the glitter pigment is preferably 0.10 to 10.0 wt %, more preferably 0.50 to 5.0 wt %, and still more preferably 1.0 to 2.5 wt % based on the total amount of the ink composition. Due to the fact that the content of the glitter pigment is 0.10 wt % or more, aggregation unevenness tends to be further suppressed. Due to the fact that the content of the glitter pigment is 10.0 wt % or less, the abrasion resistance tends to further improve. It is preferable to prepare the ink composition of the invention into a glitter ink composition containing the glitter pigment in the respect that recorded matter excellent in glitter can be obtained.

Glycol Diether

Glycol diether is represented by the following formula 1. Due to the fact that such glycol diether is contained, the drying property of the ink composition improves and the glitter of the recorded matter to be obtained further improves.

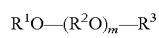  Formula 1:

(In Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4.)

The flash point of glycol diether is 70° C. or less, preferably 30 to 65° C., and more preferably 40 to 60° C. Due to the fact that the flash point of glycol diether is 70° C. or less, the drying property of the ink composition improves and the glitter of the recorded matter to be obtained further improves. Due to the fact that the flash point of glycol diether is 30° C. or more, a failure of achieving beautiful leafing due to the occurrence of aggregation of ink before the ink composition dries can be suppressed, so that the glitter tends to further improve. When the flash point of glycol diether exceeds 70° C., the drying property deteriorates, aggregation unevenness due to the aggregation of pigments occurs, and the glitter also decreases. The "flash point" used herein refers to the flash point determined by a Cleveland open cup flash point tester in the case where the flash point determined by a tag closed cup flash point tester is more than 80° C. In the case where the flash point determined by a tag closed cup flash point tester is 80° C. or less, the flash point used herein refers to the flash point determined by a tag closed cup flash point tester when the kinetic viscosity of the solvent at the flash point is less than 10 cSt or refers to the flash point determined by a Seta closed cup flash point tester when the kinetic viscosity of the solvent at the flash point is 10 cSt or more.

Such glycol diether is not particularly limited and, for example, glycol diethylether (35° C.), ethylene glycol dimethyl ether (−6° C.), diethylene glycol methyl ethyl ether (63° C.), diethylene glycol dimethyl ether (56° C.), dipropylene glycol dimethyl ether (56° C.), and propylene glycol dimethyl ether (6.5° C.) are mentioned (The numerals inside the brackets indicate the flash point). The glycol diethers may be used alone or in combination of two or more kinds thereof.

The content of glycol diether is preferably 35 to wt %, more preferably 40 to 90 wt %, and still more preferably 40 to 70 wt % based on the total amount of the ink composition. Due to the fact that the content of glycol diether is 35 wt % or more, the drying property of the ink composition improves and the state in which leafing of the glitter pigment is suppressed due to aggregation in the case where the drying speed is low, and thus the glitter of the recorded matter to be recorded is difficult to achieve is prevented, so that the glitter tends to further improve. Due to the fact that the content of glycol diether is 90 wt % or more, the balance of the drying properties can be secured.

Glycol Monoether

Glycol monoether is represented by the following formula 2. Due to the fact that such glycol monoether is contained, the drying property can be prevented from becoming excessively high and the state in which a coating film dries before the glitter pigment achieves sufficient leafing, and thus glitter cannot be obtained can be prevented, so that the glitter of the recorded matter to be obtained furthers improves. And/or, it is assumed that glitter may be obtained originating from the solvent species of glycol monoether.

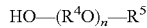   Formula 2:

(In Formula 2, $R^4$ each independently represents alkylene groups having 2 to 3 carbon atoms, $R^5$ is an alkyl group having 1 to 4 carbon atoms, and n is an integer of 1 to 4.)

Such glycol monoether is not particularly limited and, for example, ethylene glycol monoisopropyl ether (44° C.), ethylene glycol monoethyl ether (43° C.), ethylene glycol monobutyl ether (60° C.), ethylene glycol monomethyl ether (41° C.), diethylene glycol monoethyl ether (86° C.), diethylene glycol monobutyl ether (78° C.), diethylene glycol monomethyl ether (93° C.), dipropylene glycol monomethyl ether (79° C.), dipropylene glycol monobutyl ether (96° C.), tetraethylene glycol monomethyl ether (161° C.), triethylene glycol monomethyl ether (138° C.), triethylene glycol monoethyl ether (135° C.), triethylene glycol monobutyl ether (143° C.), propylene glycol monoethyl ether (38.5° C.), and propylene glycol monomethyl ether (36° C.) are mentioned (The numerals inside the brackets indicate the flash point). Glycol monoethers may be used alone or in combination of two or more kinds thereof.

The flash point of glycol monoether is preferably to 140° C., more preferably 80 to 130° C., and still more preferably 90 to 120° C. Due to the fact that the flash point of glycol monoether is within the ranges mentioned above, the glitter of the recorded matter to be obtained tends to further improve and also aggregation unevenness tends to be suppressed.

A difference between the flash point of glycol diether and the flash point of glycol monoether (Flash point of glycol monoether—Flash point of glycol diether) is preferably 10 to 100° C., more preferably 20 to 90° C., and still more preferably 30 to 80° C. Due to the fact that the difference between the flash point of glycol diether and the flash point of glycol monoether is within the ranges mentioned above, the glitter of the recorded matter to be obtained tends to further improve and also the aggregation unevenness tends to be suppressed. When a plurality of kinds of glycol diethers and/or glycol monoethers are contained in ink, the difference between the flash points is a value obtained by weight averaging the flash point of each of the plurality of kinds of glycol diethers and/or glycol monoethers by the content thereof based on the ink for each glycol diether and glycol monoether.

The content of glycol monoether is preferably 20 wt % or less, more preferably 1.0 to 15 wt % or less, still more preferably 1.0 to 12.5 wt %, and particularly preferably 3.0 to 10 wt % based on the total amount of the ink composition. Due to the fact that the content of glycol monoether is 20 wt % or less, the glitter of the recorded matter to be obtained tends to further improve and the aggregation unevenness of the recorded matter to be obtained tends to be suppressed.

The ratio A of the content of glycol diether to the content of glycol monoether (Content of glycol diether/Content of glycol monoether) is preferably 2.0 or more and less than 20, more preferably 2.0 to 15, and still more preferably 5.0 to 12.5. Due to the fact that the ratio A is within the ranges mentioned above, the glitter of the recorded matter to be obtained tends to further improve and also the aggregation unevenness tends to be suppressed.

Cyclic Lactone

The ink composition may further contain cyclic lactone. Due to the fact that cyclic lactone is contained, the abrasion resistance of the recorded matter to be obtained tends to further improve. The cyclic lactone is not particularly limited, and compounds having a cyclic structure with an ester bond and γ-lactone of a 5-membered ring structure, δ-lactone of a 6-membered ring structure, ε-lactone of a 7-membered ring structure, and the like are mentioned, for example. More specifically, γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, and ε-caprolactam are mentioned. Among the above, γ-butyrolactone and δ-valero lactone are more preferable.

The content of cyclic lactone is preferably 5.0 to wt %, more preferably 10 to 30 wt %, and still more preferably 15 to 25 wt % based on the total amount of the ink composition. Due to the fact that the content of cyclic lactone is 5.0 wt % or more, the abrasion resistance tends to further improve. Due to the fact that the content of cyclic lactone is 35 wt % or less, the image quality (glitter) tends to further improve.

Fixing Resin

The ink composition may further contain a fixing resin. Due to the fact that the fixing resin is contained, the abrasion resistance of the recorded matter to be obtained tends to further improve. The fixing resin is not particularly limited and, for example, fiber resin, such as cellulose acetate butyrate, acrylic resin, styrene acrylic resin, rosin modified resin, phenol resin, terpene resin, polyester resin, polyamide resin, epoxy resin, vinyl chloride vinyl acetate copolymer resin, vinyltoluene-α-methylstyrene copolymer resin, and the like are mentioned. Among the above, cellulose acetate butyrate is preferable. By the use of such a fixing resin, the abrasion resistance of the recorded matter to be obtained tends to further improve.

The content of the fixing resin is preferably 0.10 to 1.5 wt %, more preferably 0.20 to 1.0 wt %, and still more preferably 0.30 to 0.75 wt % based on the total amount of the ink composition. Due to the fact that the content of the fixing resin is 0.10 wt % or more, the abrasion resistance of the recorded matter to be obtained tends to further improve. Due to the fact that the content of the fixing resin is 1.5 wt % or less, the discharge stability tends to further improve.

Surfactant

The ink composition may further contain a surfactant. The surfactant is not particularly limited and, for example, acetylene glycol surfactants, fluorine based surfactants, and silicone surfactants are mentioned. Among the above, from the viewpoint of improving slipperiness and improving abrasion resistance, the silicone surfactants are preferable.

The acetylene glycol surfactants are not particularly limited and, for example, preferably one or more kinds selected from 2,4,7,9-tetramethyl-5-decyne-4,7-diol and alkylene oxide adducts of 2,4,7,9-tetramethyl-5-decyne-4,7-diol and 2,4-dimethyl-5-decyne-4-ol and alkylene oxide adducts of 2,4-dimethyl-5-decyne-4-ol. Commercially-available items of the acetylene glycol surfactant are not particularly limited and examples thereof include, for example, Olfine 104 series and E series, such as Olfine E1010 (Trade name, manufactured by Air Products Japan, Inc.), Surfynol 465 and Surfynol 61 (Trade name, manufactured by Nissin Chemical Industry Co., Ltd.), and the like. The acetylene glycol surfactants may be used alone or in combination of two or more kinds thereof.

The fluorine based surfactants are not particularly limited and examples thereof include, for example, perfluoroalkylsulfonate, perfluoroalkylcarboxylate, perfluoroalkylphosphate, a perfluoroalkyl ethylene oxide adduct, perfluoroalkyl betaine, and a perfluoroalkyl amine oxide compound. Commercially-available items of the fluorine based surfactant are not particularly limited and examples thereof include, for example, S-144 and S-145 (manufactured by Asahi Glass Co., Ltd.); FC-170C, FC-430, and Fluorad FC4430 (manufactured by Sumitomo 3M, Inc.); FSO, FSO-100, FSN, FSN-100, and FS-300 (manufactured by Dupont); FT-250 and 251 (manufactured by Neos Co., Ltd.), and the like. The fluorine based surfactants may be used alone or in combination of two or more kinds thereof.

Examples of the silicone surfactants include a polysiloxane compound, a polyether modified organosiloxane, and the like. Commercially-available items of the silicone surfactant are not particularly limited and specific examples thereof include BYK-306, BYK-307, BYK-333, BYK-341, BYK-345, BYK-346, BYK-347, BYK-348, and BYK-349 (Trade name, all manufactured by BYK Chemie Japan, Inc.), KF-96-2cs, KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (Trade name, all manufactured by Shin-Etsu Chemical Co., Ltd.), and the like. The silicone surfactants may be used alone or in combination of two or more kinds thereof.

The content of the surfactant is preferably 0.050 to 1.0 wt %, more preferably 0.10 to 0.75 wt %, and still more preferably 0.20 to 0.50 wt % based on the total amount of the ink composition.

Dispersant

The ink composition may further contain a dispersant which disperses a pigment. The dispersant is not particularly limited and anionic dispersants, nonionic dispersants, and polymer dispersants are mentioned, for example.

The anionic dispersants are not particularly limited and examples thereof include, for example, a formalin condensate of aromatic sulphonic acid, a formalin condensate of β-naphthalene sulfonate, a formalin condensate of alkyl naphthalene sulfonate, and a formalin condensate of creosote oil sulfonate.

The aromatic sulphonic acid is not particularly limited and examples thereof include, for example, alkyl naphthalene sulfonates, such as creosote oil sulfonic acid, cresol sulfonic acid, phenolsulfonic acid, β-naphtholsulfonic acid, methylnaphthalene sulfonic acid, and butyl naphthalene sulfonic acid, a mixture of β-naphthalene sulfonic acid and β-naphtholsulfonic acid, a mixture of cresol sulfonic acid and 2-naphthol-6-sulfonic acid, lignin sulfonic acid, and the like.

The nonionic dispersants are not particularly limited and an ethylene oxide adduct of phytosterol, an ethylene oxide adduct of cholestanol, and the like are mentioned, for example.

The polymer dispersants are not particularly limited and polyacrylic acid partial alkyl ester, polyalkylene polyamine, polyacrylic acid salt, a styrene-acrylic acid copolymer, a vinyl naphthalene-maleic acid copolymer, and the like are mentioned, for example.

Other Components

In order to maintain good storage stability and good discharge stability from a head of the ink composition, improve clogging, or prevent degradation of the ink composition, various additives, such as a dissolution assistant, a viscosity modifier, a pH adjuster, an antioxidant, an antiseptic, an antifungal agent, a corrosion prevention agent, and a chelating agent for capturing metal ions affecting dispersion may be added to the ink composition as appropriate.

Ink Jet Recording Method

An ink jet recording method of this embodiment has an adhesion process of causing the non-aqueous ink jet ink composition to adhere to a target recording medium.

Adhesion Process

The adhesion process is a process of causing the ink composition to adhere to a target recording medium using an ink jet method. The discharge of the ink composition by an ink jet system can be performed using a known ink jet recording apparatus. As a discharging method, a piezoelectric system, a system of discharging ink by bubbles generated in heated ink, and the like can be used.

Target Recording Medium

The target recording medium which can be used in this embodiment is not particularly limited and an absorbing target recording medium, a low-ink-absorbing target recording medium, and a non-ink-absorbing target recording medium are mentioned, for example. Among the above, as the use of the solvent ink, the low-ink-absorbing target recording medium and the non-ink-absorbing target recording medium are preferable.

The absorbing target recording medium is not particularly limited and examples thereof include, for example, plain paper, such as an electrophotographic paper having high permeability of an ink composition, an ink jet paper (an exclusive paper for ink jet printing which has an ink absorbing layer containing silica particles or alumina particles or an ink absorbing layer containing a hydrophilic polymer, such as polyvinyl alcohol (PVA) or polyvinyl pyrrolidone (PVP)), a target recording medium having a support containing paper, and the like.

The low-ink-absorbing recording medium or the non-ink-absorbing target recording medium refers to a target recording medium having a property of not absorbing an ink composition at all or hardly absorbing an ink composition, respectively. Quantitatively, the non-ink absorbing or low-ink absorbing recording medium refers to a "recording medium in which the water absorption amount from the initiation of contact to 30 msec$^{1/2}$ is 10 mL/m$^2$ or lower in the Bristow method". This Bristow method is the most popular method as a method for measuring the liquid absorption amount in a short time and is employed also in the Japan Technical Association of the Pulp and Paper Industry (JAPAN TAPPI). The details of a test method are described in "Liquid Absorbency Test Method of Paper and Paperboard (Bristow Method)" of Standard No. 51 of "JAPAN TAPPI paper pulp test method, 2000". On the other hand, the ink-absorbing target recording medium refers to a target recording medium which does not fall under the non-ink-absorbing recording medium and the low-ink-absorbing recording medium.

Examples of the non-ink-absorbing target recording medium include a plastic film not having an ink absorbing layer, a base material such as paper that is plastic-coated or has a plastic film being attached thereto, and the like. Examples of the plastic used herein include polyvinyl chloride, polyethylene terephthalate, polycarbonate, polystyrene, polyurethane, polyethylene, polypropylene, and the like.

As the ink low-ink-absorbing target recording medium, a target recording medium having a coating layer for receiving ink on the surface is mentioned, for example. As those having paper as the base material, printing paper, such as art paper, coated paper, and mat paper, are mentioned. When the base material is a plastic film, those in which the surface of the plastic film made of polyvinyl chloride, polyethylene terephthalate, polycarbonate, polystyrene, polyurethane, polyethylene, polypropylene, or the like is coated with a hydrophilic polymer, and those in which the surface of the plastic film is coated with particles of silica, titanium, or the like with a binder, and the like are mentioned.

Furthermore, besides the target recording media mentioned above, non-ink-absorbing or low-ink-absorbing target recording media, such as plates of metals, such as iron, silver, copper, and aluminum, and glass, can also be used.

EXAMPLES

Hereinafter, the invention is more specifically described with reference to Examples and Comparative Examples. The invention is not particularly limited at all by the following Examples.

Materials for Ink Composition

Main materials for ink composition used in the following Examples and Comparative Examples are as follows.

[Pigment]

Glitter pigment (which was produced in a production example described below, Average particle diameter (R50) of 1.5 μm, Thickness of 20 nm)

[Cyclic Lactone]

γ-butyro lactone

ε-valero lactone

[Glycol Diether]

DEGMEE (Diethylene glycol methyl ethyl ether, Flash point of 63° C.)

DEGdME (Diethylene glycol dimethyl ether, Flash point of 56° C.)

DEGdEE (Diethylene glycol diethylether, Flash point of 71° C.)

DEGBME (Diethylene glycol butyl methyl ether, Flash point of 94° C.)

TriEGdME (Triethylene glycol dimethyl ether, Flash point of 113° C.)

[Glycol Monoether]

DPGmBE (Dipropylene glycol monobutyl ether)

TriEGmBE (Triethylene glycol monobutyl ether)

[Surfactant]

KF-96-2cs (Shin-Etsu Chemical Co., Ltd.)

[Resin]

CAB (Cellulose acetate butyrate, Kanto Chemical Co., Ink.)

Production Example of glitter pigment dispersion liquid

On a PET film having a film thickness of 100 μm, a resin layer coating liquid containing 3.0 mass % of cellulose acetate butyrate (Butylation ratio of 35 to 39%, manufactured by Kanto Chemical Co., Ink.) and 97 mass % diethylene glycol diethylether (manufactured by NIPPON NYU-KAZAI CO., LTD.) was uniformly applied by a bar coating method, then dried at 60° C. for 10 minutes to forma a resin layer thin film on the PET film. Next, an aluminum-deposited layer having an average film thickness of 20 nm was formed on the resin layer using a vacuum deposition device (VE-1010 type vacuum deposition device manufactured by Vacuum Device Co., Ltd.).

Next, the laminate formed by the above-described method was simultaneously subjected to peeling, pulverization, and dispersion processing in diethylene glycol diethylether using a VS-150 ultrasonic disperser (manufactured by As One Corp.) to produce a metallic pigment dispersion liquid in which the integrated ultrasonic dispersion processing time was 12 hours.

The obtained metallic pigment dispersion liquid was filtered through a SUS mesh filter having a mesh opening of 5 μm to remove coarse particles. Subsequently, the filtrate was placed in a round-bottomed flask to distill off diethylene glycol diethylether using a rotary evaporator. Thus, the metallic pigment dispersion liquid was concentrated, and then the concentration of the metallic pigment dispersion liquid was adjusted to give a glitter pigment dispersion liquid.

Then, the 50% average particle diameter R50 and the average film thickness Z of the equivalent circle diameter of a major axis (Direction X)-minor axis (Direction Y) plane of the metallic pigment were measured using a particle diameter and particle size distribution meter (FPIA-30005 manufactured by Sysmex Corp.), and then R50/Z was further calculated based on the obtained measurement values of R50 and Z.

Preparation of Ink Composition

The materials were mixed with the composition shown in the following table 1, and then sufficiently stirred to give each ink composition. In the following table 1, the unit of the values is mass % and the total is 100.0 mass %. It should be noted that the values of the glitter pigments are solid content.

Δ: Aggregation unevenness is observed under magnified observation.

x: Aggregation unevenness is observed.

Abrasion Resistance

The obtained recorded matter was evaluated for abrasion resistance using color fastness rubbing tester (manufactured by TESTER SANGYO CO., LTD., trade name "AB-301") according to JIS K5701 (ISO 11628). More specifically, cotton cloth was placed on the recorded surface of the recorded matter, the surface was rubbed by moving the

TABLE 1

|  |  | Examples |  |  |  |  |  |  |  | Comparative Examples |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Pigment | Glitter pigment | 1.5 | 1.5 | 1.5 | 1.5 | 1.5 | 7 | 1.5 | 1.5 | 1.5 | 1.5 | 1.5 | 1.5 |
| Cyclic lactone | γ-butyro lactone | 20 | 20 | 20 | 20 | 20 | 20 |  | 20 | 20 | 20 | 20 | 20 |
|  | ε-valero lactone |  |  |  |  |  |  | 20 |  |  |  |  |  |
| Glycol diether | DEGMEE (Flash point of 64° C.) | 69.7 |  | 37.7 | 69.7 | 52.7 | 64.2 | 69.7 | 89.7 |  |  |  | 77.7 |
|  | DEGdME (Flash point of 56° C.) |  | 69.7 |  |  |  |  |  |  |  |  |  |  |
|  | DEGdEE (Flash point of 71° C.) |  |  |  |  |  |  |  |  | 69.7 |  |  |  |
|  | DEGBME (Flash point of 94° C.) |  |  |  |  |  |  |  |  |  | 69.7 |  |  |
|  | TriEGdME (Flash point of 113° C.) |  |  |  |  |  |  |  |  |  |  | 69.7 |  |
| Glycol monoether | DPGmBE | 8 | 8 | 40 |  | 25 | 8 | 8 | 8 | 8 | 8 | 8 | 8 |
|  | TriEGmBE |  |  |  | 8 |  |  |  |  |  |  |  |  |
| Surfactant | KF-96-2cs | 0.3 | 0.3 | 0.3 | 0.3 | 0.3 | 0.3 | 0.3 | 0.3 | 0.3 | 0.3 | 0.3 | 0.3 |
| Fixing resin | CAB | 0.5 | 0.5 | 0.5 | 0.5 | 0.5 | 0.5 | 0.5 | 0.5 | 0.5 | 0.5 | 0.5 | 0.5 |
| Total |  | 100 | 100 | 100 | 100 | 100 | 100 | 100 | 100 | 100 | 100 | 100 | 100 |
| Glycol diether content/Glycol monoether content |  | 8.71 | 8.71 | 0.94 | 8.71 | 2.11 | 8.03 | 8.71 | 11.21 | 8.71 | 8.71 | 8.71 |  |
| Evaluation | Image quality (Glitter) | ○ | ○ | Δ | ○ | ○ | ○ | ○ | ○ | x | x | x | x |
|  | Aggregation unevenness | ○ | ○ | Δ | ○ | Δ | ○ | ○ | ○ | ○ | Δ | x | ○ |
|  | Abrasion resistance | ○ | ○ | ○ | ○ | ○ | Δ | ○ | Δ | ○ | ○ | ○ | ○ |

Evaluation

Method for Producing Recorded Matter

Each ink composition of Examples and Comparative Examples was evaluated in printing tests using an ink jet printer (manufactured by Seiko Epson Corp., Type "SC-S70650"). Each ink composition was adhered to a gloss polyvinyl chloride sheet (Roland DG, Type: SV-G-1270G) at 100% concentration with a recording resolution of 720× 1440 dpi, and then dried at 25° C. and −65% RH (relative humidity) for one day to produce a sample of recorded matter.

Image Quality (Glitter)

The 20° reflection glossiness of the recorded surface of the obtained recorded matter was measured using a glossmeter MULTI Gloss 268 (manufactured by Konica Minolta Co., Ltd.). The evaluation results are shown in Table 1. The evaluation criteria are as follows.

○: 300 or more

Δ: 200 or more and less than 300 x: less than 200

Aggregation Unevenness

The aggregation unevenness was evaluated by visually observing aggregation unevenness of the pigment on the recorded surface of the obtained recorded matter. The evaluation results are shown in Table 1. The evaluation criteria are as follows.

Evaluation Criteria

○: Aggregation unevenness is not observed even under magnified observation.

cotton cloth 20 times under a load of 500 g, and then the peeled state of the recorded surface of the recorded matter after rubbing was visually observed. The evaluation results are shown in Table 1. The evaluation criteria are as follows.

Evaluation Criteria

○: The cotton cloth is not stained. The recorded surface is not damaged.

Δ: Adhesion of the recorded matter is observed on the cotton cloth. The recorded surface is hardly damaged.

x: Adhesion of the recorded matter is observed on the cotton cloth. The recorded surface is damaged.

As described above, in Examples, recorded matter having glitter, suppressed aggregation unevenness, and abrasion resistance was able to be obtained. On the other hand, in Comparative Examples 1 and 3 using glycol diether having a high flash point, it was assumed that the glitter of the obtained recorded matter decreased due to poor drying properties of the ink compositions. In Comparative Example 4 in which glycol monoether was not contained, it is assumed that the glitter of the obtained recorded matter decreased due to excessively high drying properties of the ink composition. When the flash point of glycol diether was higher, the aggregation unevenness degree was higher.

The entire disclosure of Japanese Patent Application No. 2015-029270, filed Feb. 18, 2015 is expressly incorporated by reference herein.

What is claimed is:

1. A non-aqueous ink jet ink composition comprising:
a glitter pigment;

glycol diether represented by Formula 1 shown below and having a flash point of 70° C. or less; and glycol monoether represented by the following formula 2:

$$R^1O\text{—}(R^2O)_m\text{—}R^3 \quad \text{Formula 1:}$$

wherein, in Formula 1, $R^1$ and $R^3$ each independently represent alkyl groups having 1 to 4 carbon atoms, $R^2$ each independently represents alkylene groups having 2 to 3 carbon atoms, and m is an integer of 1 to 4; and $$HO\text{—}(R^4O)_n\text{—}R^5 \quad \text{Formula 2:}$$

wherein, in Formula 2, $R^4$ each independently represents alkylene groups having 2 to 3 carbon atoms, $R^5$ is an alkyl group having 1 to 4 carbon atoms, and n is an integer of 1 to 4.

2. The non-aqueous ink jet ink composition according to claim 1, wherein a content of the glycol diether is 40 to 90 wt %.

3. The non-aqueous ink jet ink composition according to claim 1, wherein a content of the glycol monoether is 20 wt % or less.

4. The non-aqueous ink jet ink composition according to claim 1, wherein a content of the glitter pigment is 0.50 to 5.0 wt %.

5. The non-aqueous ink jet ink composition according to claim 1, wherein a ratio of the content of the glycol diether to the content of the glycol monoether (Content of the glycol diether/Content of the glycol monoether) is 2.0 or more and less than 20.

6. The non-aqueous ink jet ink composition according to claim 1, further comprising cyclic lactone.

7. The non-aqueous ink jet ink composition according to claim 1, further comprising cellulose acetate butyrate.

8. The non-aqueous ink jet ink composition according to claim 1, wherein
the glitter pigment has a plate-like particle, and
a 50% average particle diameter R50 of an equivalent circle diameter determined from an area of an X-Y plane of the plate-like particles is 0.20 to 3.0 μm.

9. An ink jet recording method comprising:
causing the non-aqueous ink jet ink composition according to claim 1 to adhere to a target recording medium.

10. An ink jet recording method comprising:
causing the non-aqueous ink jet ink composition according to claim 2 to adhere to a target recording medium.

11. An ink jet recording method comprising:
causing the non-aqueous ink jet ink composition according to claim 3 to adhere to a target recording medium.

12. An ink jet recording method comprising:
causing the non-aqueous ink jet ink composition according to claim 4 to adhere to a target recording medium.

13. An ink jet recording method comprising:
causing the non-aqueous ink jet ink composition according to claim 5 to adhere to a target recording medium.

14. An ink jet recording method comprising:
causing the non-aqueous ink jet ink composition according to claim 6 to adhere to a target recording medium.

15. An ink jet recording method comprising:
causing the non-aqueous ink jet ink composition according to claim 7 to adhere to a target recording medium.

16. An ink jet recording method comprising:
causing the non-aqueous ink jet ink composition according to claim 8 to adhere to a target recording medium.

* * * * *